US012619056B2

(12) United States Patent
    Ichimura

(10) Patent No.: US 12,619,056 B2
(45) Date of Patent: May 5, 2026

(54) ZOOM LENS, AND IMAGE PICKUP APPARATUS HAVING THE SAME

(71) Applicant: CANON KABUSHIKI KAISHA, Tokyo (JP)

(72) Inventor: Junya Ichimura, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 18/332,791

(22) Filed: Jun. 12, 2023

(65) Prior Publication Data

US 2023/0408800 A1 Dec. 21, 2023

(30) Foreign Application Priority Data

Jun. 15, 2022 (JP) ................................. 2022-096184

(51) Int. Cl.
G02B 15/14 (2006.01)
G02B 13/02 (2006.01)

(52) U.S. Cl.
CPC ...... G02B 15/145113 (2019.08); G02B 13/02 (2013.01)

(58) Field of Classification Search
CPC .. G02B 15/173; G02B 27/646; G02B 15/177; G02B 15/14; G02B 13/009; G02B 15/161; G02B 15/22; G02B 13/18; G02B 27/0025; G02B 15/145113; G02B 13/02; G02B 15/1421; G02B 15/16; H04N 5/23296; G03B 2205/0007; G03B 2205/0046
USPC ........ 359/683–684, 686–687, 689, 690–695, 359/705, 714, 739, 740, 741, 745, 752, 359/756, 757, 763, 766, 554
See application file for complete search history.

(56) References Cited

U.S. PATENT DOCUMENTS

| | | | | |
|---|---|---|---|---|
| 9,645,369 B2 * | 5/2017 | Takemoto | ...... | G02B 15/145113 |
| 9,784,951 B2 | 10/2017 | Ichimura | | |
| 10,139,606 B2 | 11/2018 | Ichimura | | |
| 10,942,361 B2 | 3/2021 | Ichimura | | |
| 11,243,385 B2 | 2/2022 | Katayose et al. | | |
| 11,347,026 B2 | 5/2022 | Ichimura | | |

(Continued)

FOREIGN PATENT DOCUMENTS

| | | |
|---|---|---|
| JP | H08-327903 A | 12/1996 |
| WO | 2018/074413 A1 | 4/2018 |

OTHER PUBLICATIONS

Gross et al. "Handbook of Optical Systems vol. 3: Aberration Theory and Correction of Optical Systems" Weinheim Germany, WILEY-VCH Verlag GmbH & Co. KGaA, pp. 377-379 (Year: 2007).*

*Primary Examiner* — Thomas K Pham
*Assistant Examiner* — Kuei-Jen L Edenfield
(74) *Attorney, Agent, or Firm* — Carter, DeLuca & Farrell LLP

(57) ABSTRACT

A zoom lens includes, in order from an object side to an image side, a first lens unit having positive refractive power, a second lens unit having negative refractive power, a third lens unit having positive refractive power, a fourth lens unit having positive refractive power, and a fifth lens unit having negative refractive power. During zooming from a wide-angle end to a telephoto end, a distance between adjacent lens units changes, the first lens unit and the third lens unit are fixed, and the second lens unit and the fourth lens unit move. The third lens unit includes a negative lens and a positive lens. A predetermined condition is satisfied.

17 Claims, 7 Drawing Sheets

(56) References Cited

U.S. PATENT DOCUMENTS

| | | | | |
|---|---|---|---|---|
| 2009/0195885 A1* | 8/2009 | Yamanaka | ..... | G02B 15/145113 |
| | | | | 359/683 |
| 2009/0237805 A1* | 9/2009 | Fujihara | ......... | G02B 15/144113 |
| | | | | 359/687 |
| 2010/0033838 A1* | 2/2010 | Saori | ................... | G02B 15/173 |
| | | | | 359/683 |
| 2012/0320251 A1* | 12/2012 | Saito | ................... | G02B 15/173 |
| | | | | 359/683 |
| 2020/0257096 A1* | 8/2020 | Ito | ........................ | G02B 13/009 |
| 2021/0157156 A1 | 5/2021 | Ichimura | | |
| 2021/0263286 A1 | 8/2021 | Ichimura | | |
| 2022/0121020 A1* | 4/2022 | Makida | ................ | G02B 27/646 |

* cited by examiner

ZOOM LENS, AND IMAGE PICKUP APPARATUS HAVING THE SAME

BACKGROUND

Technical Field

One of the aspects of the disclosure relates to a zoom lens, and more particularly to a zoom lens suitable for an image pickup apparatus, such as a digital video camera, a digital still camera, a broadcasting camera, a film-based camera, a surveillance camera, and the like.

Description of Related Art

An overall length fixed type zoom lens is known in which the overall lens length does not change during zooming. Such a zoom lens is suitable to capture a moving image and the like because the center of gravity little changes during zooming. Recently, zoom lenses are demanded to have a high zoom magnification and high optical performance over an overall zoom range for moving image applications.

Each of Japanese Patent Laid-Open No. 8-327903 and PCT International Publication No. 2018/074413 discloses, as the overall length fixed type zoom lens, a zoom lens that consists of a first lens unit having positive refractive power, a second lens unit having negative refractive power, a third lens unit having positive refractive power, a fourth lens unit having positive refractive power, and a fifth lens unit having negative refractive power. The zoom lens disclosed in each of Japanese Patent Laid-Open No. 8-327903 and PCT International Publication No. 2018/074413 is configured such that the second lens unit and the fourth lens unit move during zooming.

The zoom lens disclosed in Japanese Patent Laid-Open No. 8-327903 is excellent in the small number of lens units that move during zooming and focusing, but higher optical performance is demanded along with the recent high resolution trend of sensors.

The zoom lens disclosed in PCT International Publication No. 2018/074413 has high optical performance over the overall zoom range by increasing the number of lenses in each lens unit, but is demanded to have a higher zoom magnification.

SUMMARY

One of the aspects of the present disclosure provides an overall length fixed type zoom lens that has a high zoom magnification and high optical performance over an overall zoom range.

A zoom lens according to one aspect of the disclosure includes, in order from an object side to an image side, a first lens unit having positive refractive power, a second lens unit having negative refractive power, a third lens unit having positive refractive power, a fourth lens unit having positive refractive power, and a fifth lens unit having negative refractive power. During zooming from a wide-angle end to a telephoto end, a distance between adjacent lens units changes, the first lens unit and the third lens unit are fixed, and the second lens unit and the fourth lens unit move. The third lens unit includes a negative lens and a positive lens. The following inequalities are satisfied:

$$-3.50 < \beta 3w/\beta 3t < -0.10$$

$$-10.0 < f1/f2 < -4.0$$

where $\beta 3w$ is a lateral magnification of the third lens unit at the wide-angle end, $\beta 3t$ is a lateral magnification of the third lens unit at the telephoto end, f1 is a focal length of the first lens unit, and f2 is a focal length of the second lens unit. An image pickup apparatus having the above zoom lens also constitutes another aspect of the disclosure.

Further features of the disclosure will become apparent from the following description of embodiments with reference to the attached drawings.

DESCRIPTION OF THE EMBODIMENTS

Referring now to the accompanying drawings, a description will be given of a zoom lens according to each example of the disclosure and an image pickup apparatus having the zoom lens.

Figure 1:
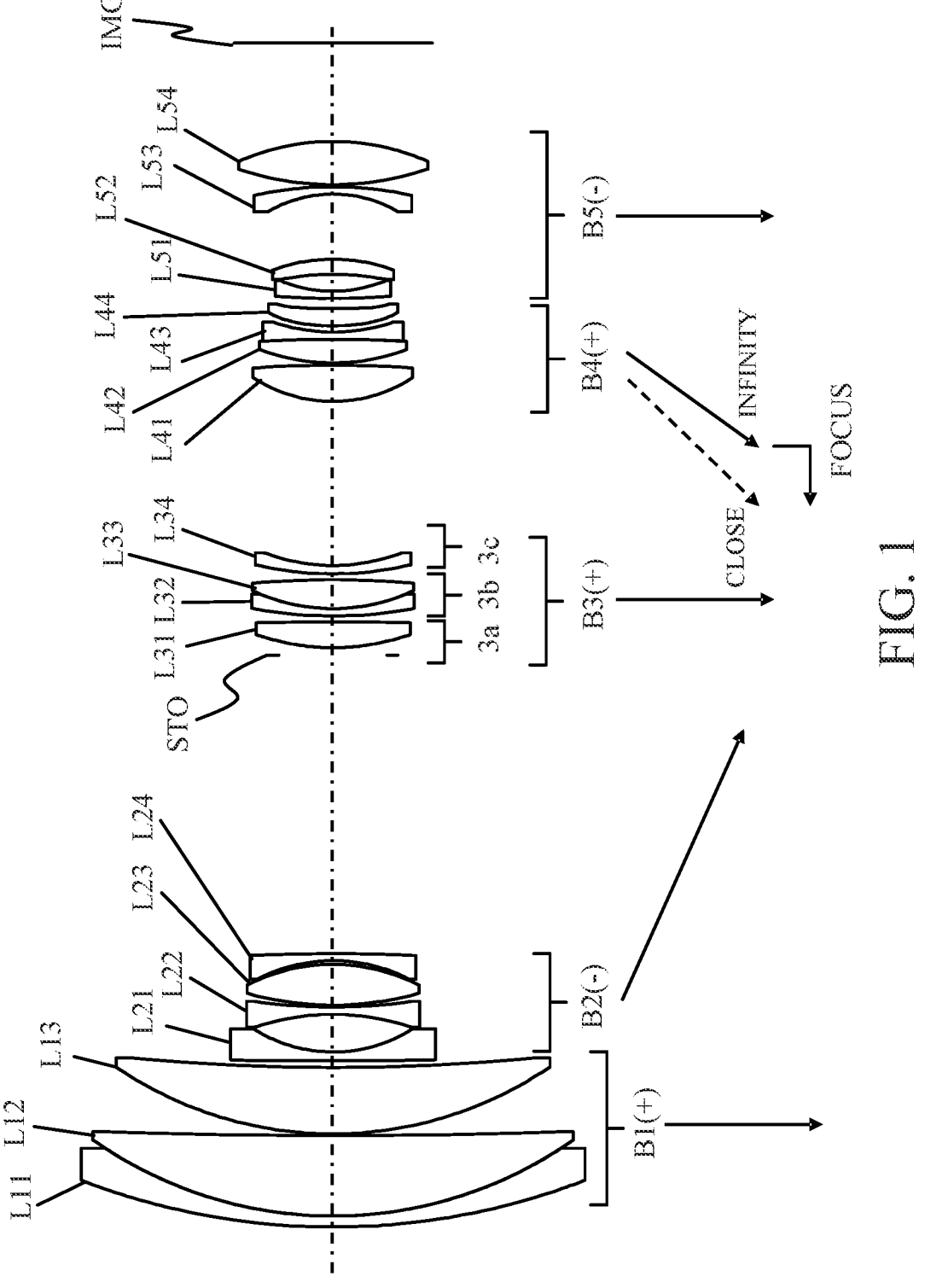
FIG. 1 is a sectional view of a zoom lens according to Example 1.
Figure 2:
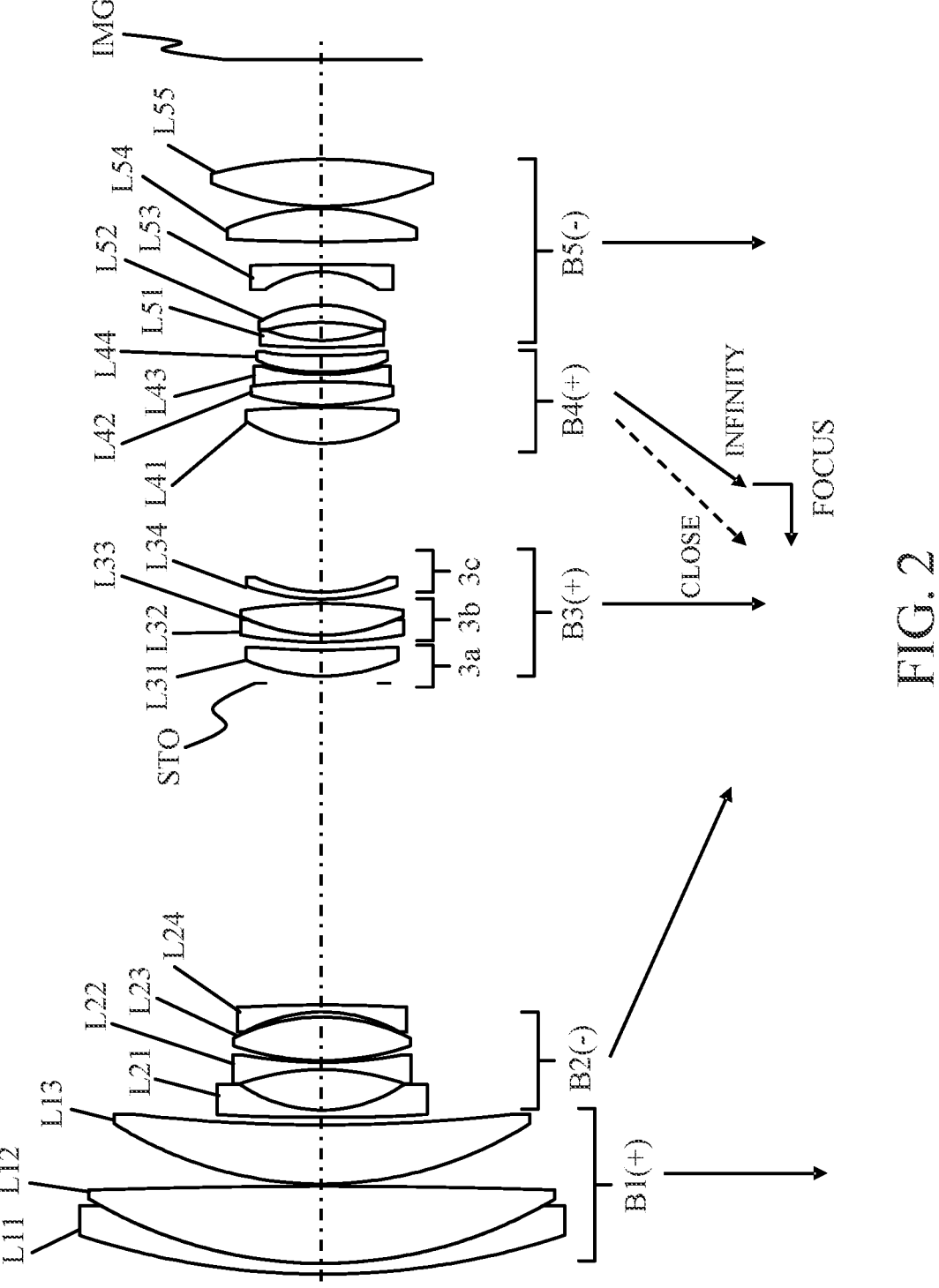
FIG. 2 is a sectional view of a zoom lens according to Example 2.
Figure 3:
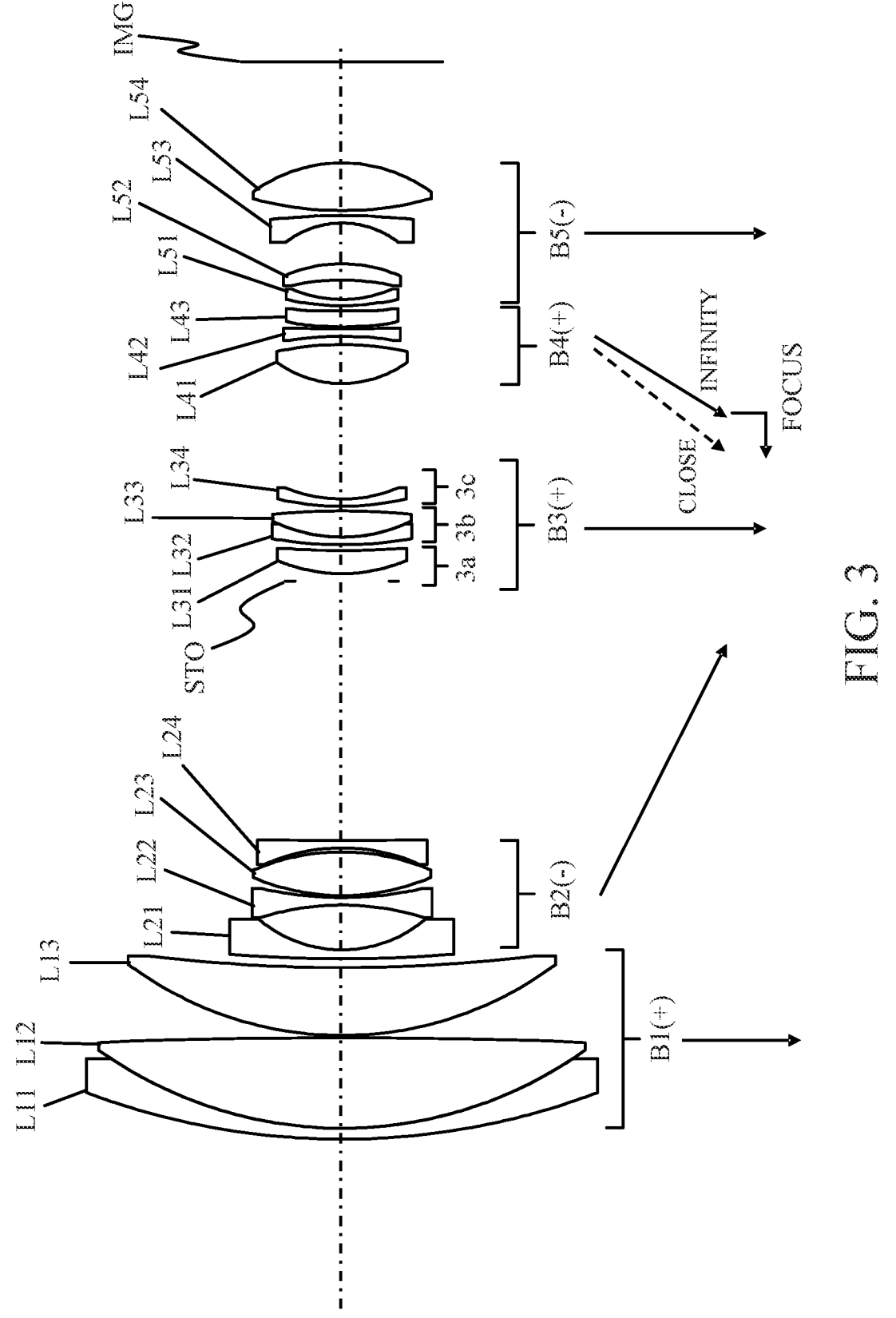
FIG. 3 is a sectional view of a zoom lens according to Example 3.

FIGS. 1, 2, and 3 are sectional views of the zoom lenses according to Examples 1 to 3, respectively, in in-focus states at infinity (or on the infinity object). The zoom lens according to each example is used for an image pickup apparatus such as a digital video camera, a digital still camera, a broadcasting camera, a film-based camera, a surveillance camera, and the like.

In each lens sectional view, a left side is an object side and a right side is an image side. The zoom lens according to each example includes a plurality of lens units. In the specification of this application, a lens unit is a group of lenses that move or stand still during zooming. That is, in the zoom lens according to each example, a distance between adjacent lens units changes during zooming from the wide-angle end to the telephoto end. The lens unit may include one or more lenses. The lens unit may include an aperture stop (diaphragm). A wide-angle end and a telephoto end are zoom states (zoom positions) in a case where the lens unit during zooming is located at both ends of a mechanically movable range in the optical axis direction.

In each lens sectional view, Bi represents an i-th (i is a natural number) lens unit counted from the object side among the lens units included in the zoom lens. L1i represents an i-th (i is a natural number) lens counted from the object side among lenses included in the first lens unit B1. L2i represents an i-th (i is a natural number) lens counted from the object side among lenses included in the second lens unit B2. L3i represents an i-th (i is a natural number) lens counted from the object side among lenses included in the third lens unit B3. L4*i* represents the i-th (i is a natural number) lens counted from the object side among lenses included in the fourth lens unit B4. L5*i* represents an i-th (i is a natural number) lens counted from the object side among lenses included in the fifth lens unit B5.

STO represents an aperture stop. IMG represents an image plane. In a case where the zoom lens according to each example is used as an imaging optical system of a digital still camera or a digital video camera, an imaging plane of a solid image sensor (photoelectric conversion element) such as a CCD sensor or a CMOS sensor is placed on the image plane IMG. In a case where the zoom lens according to each example is used as an imaging optical system of a film-based camera, a photosensitive surface corresponding to the film plane is placed on the image plane IMG.

In each lens sectional view, an arrow indicates a moving locus of a lens unit that moves during zooming from the wide-angle end to the telephoto end. A solid-line arrow represents the movement of the lens unit during zooming from the wide-angle end to the telephoto end in an in-focus state at the infinity object distance, and a dashed-line arrow represents the movement of the lens unit during zooming from the wide-angle end to the telephoto end in an in-focus state at a short object distance. An arrow relating to focus indicates a moving direction of the lens unit during focusing from an infinity object to a close (short distance) object (from infinity to close).

Figure 4A:
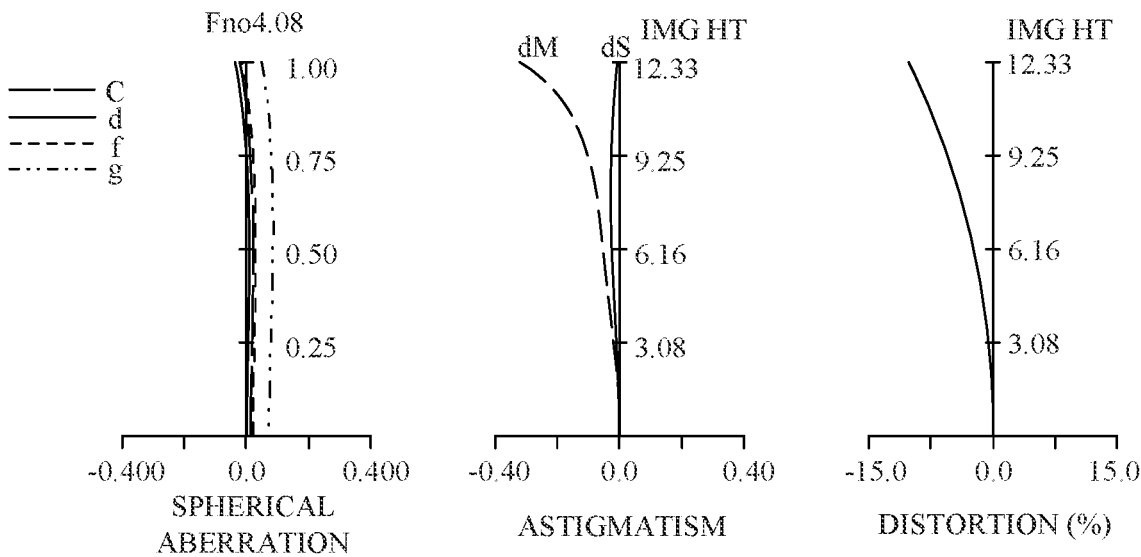
FIG. 4A is an aberration diagram of the zoom lens according to Example 1 at a wide-angle end and FIG. 4B is an aberration diagram of the zoom lens according to Example 1 at a telephoto end.
Figure 4B:
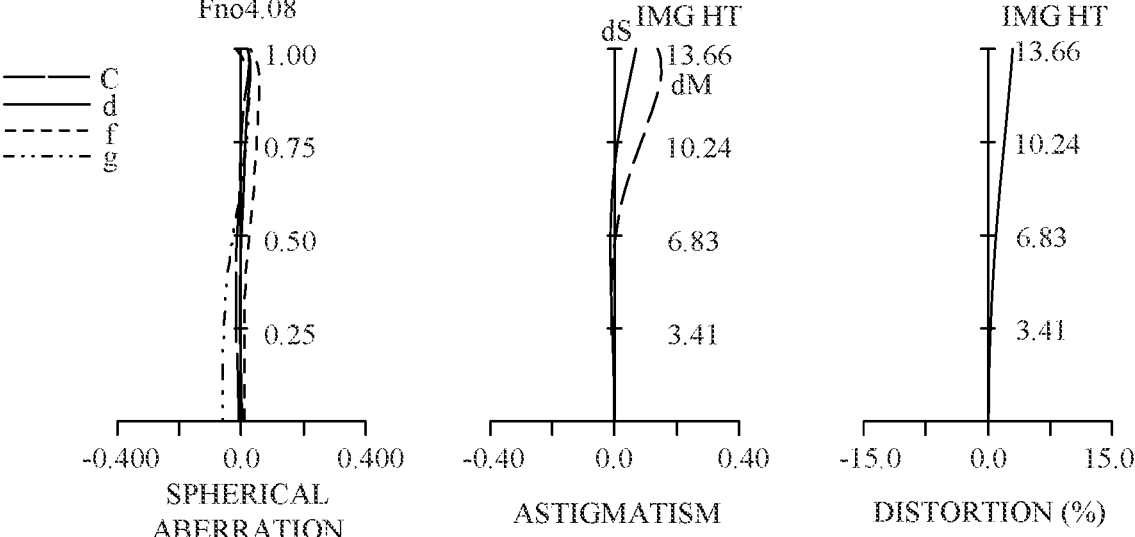
Figure 5A:
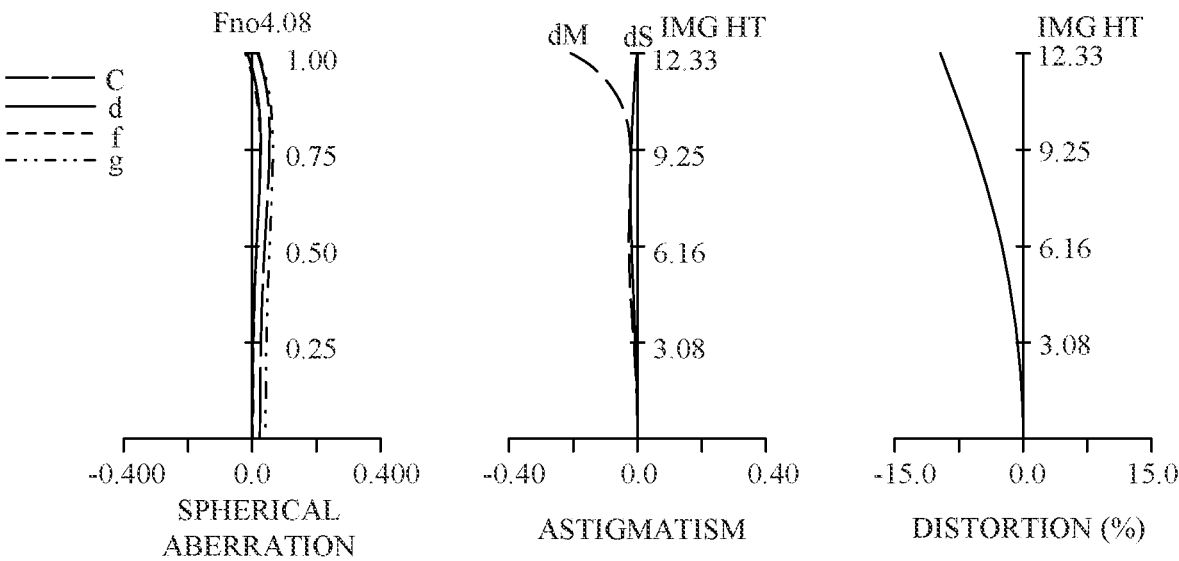
FIG. 5A is an aberration diagram of the zoom lens according to Example 2 at a wide-angle end and FIG. 5B is an aberration diagram of the zoom lens according to Example 2 at a telephoto end.
Figure 5B:
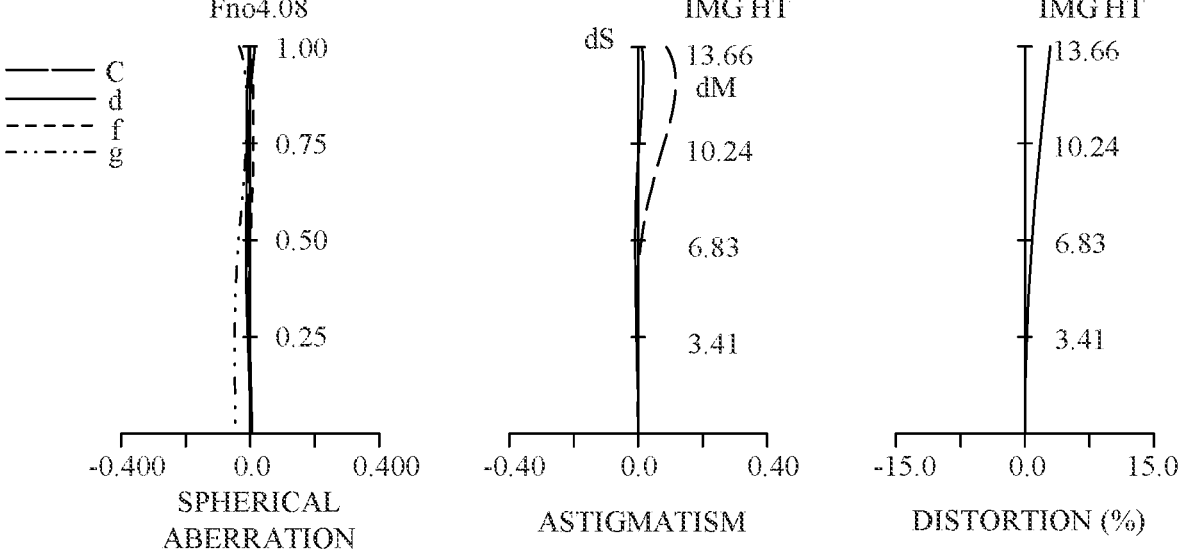
Figure 6A:
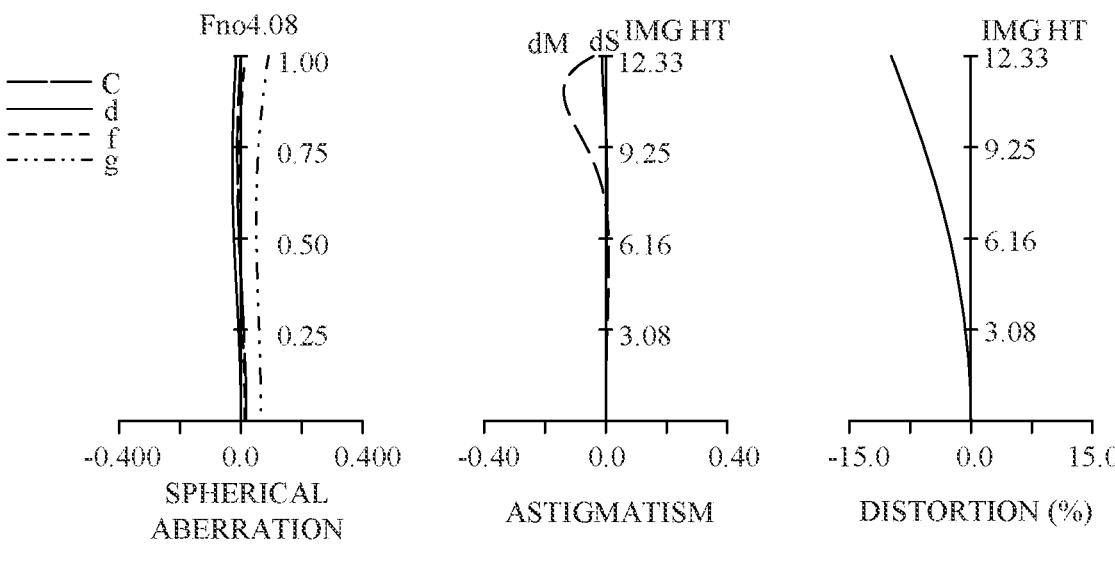
FIG. 6A is an aberration diagram of the zoom lens according to Example 3 at a wide-angle end and FIG. 6B is an aberration diagram of the zoom lens according to Example 3 at a telephoto end.
Figure 6B:
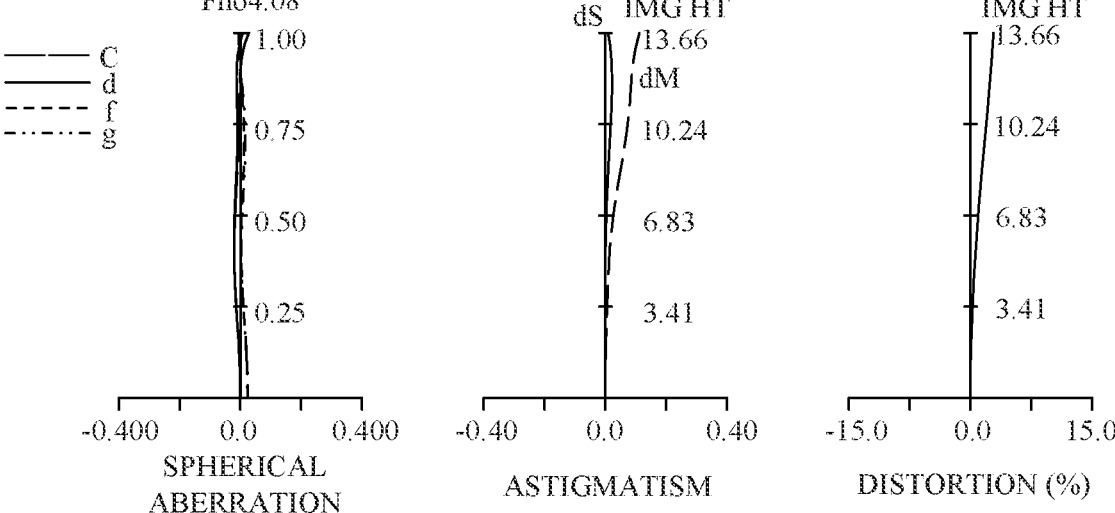

FIGS. 4A and 4B, 5A and 5B, and 6A and 6B are aberration diagrams of the zoom lenses according to Examples 1 to 3, respectively, in the in-focus states at infinity. In each aberration diagram, FIGS. 4A, 5A, and 6A are aberration diagrams at the wide-angle end, and FIGS. 4B, 5B, and 6B are aberration diagrams at the telephoto end.

In the spherical aberration diagram, Fno represents an F-number. The spherical aberration diagram indicates spherical aberration amounts for the d-line (wavelength 587.56 nm), F-line (486.13 nm), C-line (656.27 nm), and g-line (wavelength 435.83 nm). The scale of the horizontal axis represents a defocus amount, indicated by –0.4 to +0.4 [mm]. In the astigmatism diagram, dS indicates an astigmatism amount on a sagittal image plane, and dM indicates an astigmatism amount on a meridional image plane. The scale of the horizontal axis represents a defocus amount, indicated by –0.4 to +0.4 [mm]. The distortion diagram illustrates a distortion amount for the d-line. In the distortion diagram, the scale of the horizontal axis ranges from –15 to +15 [%].

A description will now be given of the characteristic configuration of the zoom lens according to each example.

The zoom lens according to each example includes, in order from the object side to the image side, a first lens unit B1 having positive refractive power, a second lens unit B2 having negative refractive power, a third lens unit B3 having positive refractive power, a fourth lens unit B4 having positive refractive power, and a fifth lens unit B5 having negative refractive power. In the zoom lens according to each example, a distance between adjacent lens units changes during zooming from the wide-angle end to the telephoto end.

In order to achieve a high zoom magnification and high optical performance over the entire zoom range, the zoom lens may include multiple lens units and may change the distance between adjacent lens units but a mechanical structure will become complicated. Thus, it becomes difficult to achieve a smooth zooming operation from the wide-angle end to the telephoto end using an electric actuator.

In the zoom lens according to each example, during zooming from the wide-angle end to the telephoto end, the first lens unit B1 and the third lens unit B3 are fixed, and the second lens unit B2 and the fourth lens unit B4 move along the optical axis. Using two lens units that move during zooming can provide zooming with a simple structure. Since the first lens unit B1, which is the heaviest lens unit, is fixed during zooming, changes in the center of gravity of the lens during zooming can be suppressed.

As the zoom structure becomes simple, it becomes difficult to correct various aberrations over the entire zoom range, and fixing the first lens unit B1 may cause the overall lens length to increase.

Accordingly, in the zoom lens according to each example, the third lens unit includes a negative lens and a positive lens. Thereby, longitudinal chromatic aberration and spherical aberration can be easily corrected, and the image stabilizing unit can be easily placed.

The zoom lens according to each example satisfies the following inequalities (1) and (2):

$$-3.50 < \beta 3w/\beta 3t < -0.10 \tag{1}$$

$$-10.0 < f1/f2 < -4.0 \tag{2}$$

where $\beta 3w$ is a lateral magnification of the third lens unit B3 at the wide-angle end, $\beta 3t$ is a lateral magnification of the third lens unit B3 at the telephoto end, f1 is a focal length of the first lens unit B1, and f2 is a focal length of the second lens unit B2.

Inequality (1) defines a change in lateral magnification of the third lens unit B3. In a case where inequality (1) is satisfied, the light emitted from the third lens unit B3 may become parallel during zooming from the wide-angle end to the telephoto end, so the change in the angle of light incident on the fourth lens unit B4 can be suppressed. Therefore, aberration fluctuations during zooming and focusing can be suppressed. In a case where the value $\beta 3w/\beta 3t$ is higher than the upper limit of inequality (1), the light ray angle incident on the fourth lens unit B4 at the wide-angle end becomes high, and changes in spherical aberration and longitudinal chromatic aberration tend to occur. In a case where the value $\beta 3w/\beta 3t$ is lower than the lower limit of inequality (1), the light ray angle incident on the fourth lens unit B4 at the telephoto end becomes high, and changes in spherical aberration and longitudinal chromatic aberration tend to occur at the telephoto end.

Inequality (2) defines a ratio of the refractive powers of the first lens unit B1 and the second lens unit B2, and indicates a range of the refractive power arrangement of the main magnification varying unit. In a case where the value f1/f2 is higher than the upper limit of inequality (2), the refractive power of the second lens unit B2 becomes too strong, and fluctuations in curvature of field and spherical aberration during zooming cannot be satisfactorily corrected. In a case where the value f1/f2 is lower than the lower limit of inequality (2), the refractive power difference becomes too small to obtain a predetermined zoom magnification, or the movement of the second lens unit B2 becomes too large and the overall lens length becomes too long.

Inequalities (1) and (2) may be replaced with inequalities (1a) and (2a) below:

$$-2.00 < \beta 3w/\beta 3t < -0.15 \tag{1a}$$

$$-8.5 < f1/f2 < -4.5 \tag{2a}$$

Inequalities (1) and (2) may be replaced with inequalities (1b) and (2b) below:

$$-1.20 < \beta 3w/\beta 3t < -0.20 \tag{1b}$$

$$-7.0 < f1/f2 < -5.0 \tag{2b}$$

A description will now be given of the configuration that may be satisfied in the zoom lens according to each example.

The first lens unit B1 may consist of, in order from the object side to the image side, a cemented lens of a negative lens L11 and a positive lens L12, and a positive lens L13. Thereby, a moving amount of the second lens unit B2 during zooming can be easily secured while the overall lens length is reduced.

During zooming from the wide-angle end to the telephoto end, the second lens unit B2 may move toward the image side and the fourth lens unit B4 may move toward the object side. Main zooming can be performed by significantly changing the distance between the first lens unit B1 and the second lens unit B2 while the moving amount of the second lens unit B2 is secured, and auxiliary zooming and image points can be corrected by moving the fourth lens unit B4 toward the object side.

The second lens unit B2 and the fourth lens unit B4 may be moved using a conventional metal cam, but in a case where the second lens unit B2 and the fourth lens unit B4 are moved by using a direct-acting actuator, zooming and focusing can be performed at high speed. Thus, the second lens unit B2 and the fourth lens unit B4 are demanded to be relatively lightweight. Accordingly, the second lens unit B2 may include four lenses or less. For example, the second lens unit B2 includes, in order from the object side to the image side, a negative lens L21, a negative lens L22, a positive lens L23, and a negative lens L24. Thereby, the zoom fluctuations caused by the curvature of field and the lateral chromatic aberration can be reduced.

The third lens unit B3 may be fixed during zooming and focusing, and include the aperture stop STO and the image stabilizing subunit. Thereby, performance improvement during image stabilization and the simple zoom lens structure are achieved. Placing the aperture stop STO in the always fixed third lens unit B3 can simplify the lens barrel structure.

Moving the image stabilizing partial unit, which is part of the third lens unit B3, in a direction having a component of the direction orthogonal to the optical axis during the image stabilization can reduce image plane fluctuations during image stabilization. The third lens unit B3 may include, in order from the object side to the image side, a first subunit 3a having positive refractive power, a second subunit 3b having positive refractive power, and a third subunit 3c having negative refractive power. The image stabilization is performed by moving the second subunit 3b as an image stabilizing subunit in the direction having the component in the direction orthogonal to the optical axis. The second subunit 3b may include a cemented lens of a negative lens and a positive lens arranged in order from the object side to the image side in order to reduce color misregistration during image stabilization.

The fourth lens unit B4 may include three or four lenses for weight reduction. For example, the fourth lens unit B4 may include, in order from the object side to the image side, a positive lens L41, a positive lens L42, a negative lens L43, and a positive lens L44. Thereby, fluctuations in curvature of field and spherical aberration during zooming and focusing can be suppressed.

The fifth lens unit B5 may include at least four lenses. For example, the fifth lens unit B5 may include, in order from the object side to the image side, a negative lens L51, a positive lens L52, a negative lens L53, and a positive lens L54. Placing the refractive power of the fifth lens unit B5 in this manner moves the position of the exit pupil toward the object side, thereby reducing the size of the zoom lens and the incident angle on the image plane.

The fourth lens unit B4 may be moved toward the object during focusing from infinity to close. Focusing using the fourth lens unit B4 that moves during zooming can provide zooming and focusing with a simple structure.

A description will now be given of conditions that the zoom lens according to each example may satisfy. The zoom lens according to each example may satisfy one or more of the following inequality (3) to (12):

$$0.2 < BF/fw < 1.2 \tag{3}$$

$$0.8 < M2/D1 < 3.0 \tag{4}$$

$$2.0 < f1/fw < 12.0 \tag{5}$$

$$-0.8 < f2/f4 < -0.3 \tag{6}$$

$$1.0 < f3/f4 < 2.0 \tag{7}$$

$$1.5 < f5/f2 < 10.0 \tag{8}$$

$$-6.0 < M2/M4 < 0.0 \tag{9}$$

$$1.2 < fis/f3 < 2.0 \tag{10}$$

$$-0.00163 \times vd + 0.65800 < \theta gf < -0.00163 \times vd + 0.7500 \tag{11}$$

$$15.0 < vd < 24.2 \tag{12}$$

Here, BF is an air equivalent length (back focus) of a distance on the optical axis from a lens surface closest to the image plane to the image plane IMG at the wide-angle end of the zoom lens. fw is a focal length of the zoom lens at the wide-angle end. M2 is a moving amount of the second lens unit B2 during zooming from the wide-angle end to the telephoto end. A moving amount of the lens unit corresponds to a difference between the position on the optical axis at the wide-angle end and the position on the optical axis at the telephoto end. The sign of the moving amount is positive when the lens unit is located closer to the image plane at the telephoto end than at the wide-angle end, and negative when the lens unit is located closer to the object at the telephoto end than at the wide-angle end. D1 is a distance on the optical axis from a lens surface closest to the object of the first lens unit B1 to a lens surface closest to the image plane of the first lens unit B1 (thickness of the first lens unit on the optical axis). f4 is a focal length of the fourth lens unit B4. f3 is a focal length of the third lens unit B3. f5 is a focal length of the fifth lens unit B5. M4 is a moving amount of the fourth lens unit B4 during zooming from the wide-angle end to the telephoto end. fis is a focal length of the image stabilizing subunit included in the third lens unit B3. θgf is a partial dispersion ratio for the g-line and f-line of positive lenses included in the fifth lens unit B5. vd is an Abbe number based on the d-line of the positive lens included in the fifth lens unit B5.

Inequality (3) defines a ratio of the focal length of the zoom lens to the back focus of the zoom lens at the wide-angle end. Satisfying inequality (3) can reduce the overall lens length. In a case where the value BF/fw is higher than the upper limit of inequality (3), the back focus of the zoom lens is too long relative to the focal length of the zoom lens at the wide-angle end, and the overall lens length increases to secure the moving amount of the moving lens unit. In a case where the value BF/fw is lower than the lower limit of inequality (3), the final lens becomes too close to the image plane IMG, the lens diameter of the final lens becomes large, and the final lens cannot be accommodated within a predetermined lens mount diameter.

Inequality (4) defines conditions for achieving a compact zoom lens. In a case where the value M2/D1 is higher than the upper limit of inequality (4), the moving amount of the second lens unit B2 becomes too large, and the overall lens length becomes long. In a case where the value M2/D1 is lower than the lower limit of inequality (4), the moving amount of the second lens unit B2 becomes small and various aberrations degrade, or the overall lens length becomes long and the lens diameter of the first lens unit B1 becomes too large.

Inequality (5) defines a ratio of the focal length of the first lens unit B1 to the focal length of the zoom lens at the wide-angle end, and defines a range of the first lens unit B1. In a case where the value f1/fw is higher than the upper limit of inequality (5), the refractive power of the first lens unit B1 becomes too weak and a predetermined zoom ratio cannot be obtained. In a case where the value f1/fw is lower than the lower limit of inequality (5), the refractive power of the first lens unit B1 becomes too strong, and spherical aberration and longitudinal chromatic aberration at the telephoto end tend to deteriorate.

Inequality (6) defines a range of the ratio of the focal lengths of the two moving units, the second lens unit B2 and the fourth lens unit B4. In a case where the value f2/f4 is higher than the upper limit of inequality (6), the refractive power of the second lens unit B2 becomes too strong relative to the refractive power of the fourth lens unit B4, and fluctuations in field curvature and spherical aberration during zooming cannot be corrected. In a case where the value f2/f4 is lower than the lower limit of inequality (6), the refractive power of the second lens unit B2 becomes too weak, and it becomes difficult to achieve a high zooming ratio.

Inequality (7) defines a range of the ratio of the focal lengths of the third lens unit B3 and the fourth lens unit B4. In a case where the value f3/f4 becomes higher than the upper limit of inequality (7), the refractive power of the third lens unit B3 becomes too weak, the share of the zoom ratio of the third lens unit B3 decreases, and various aberrations tend to deteriorate. In a case where the value f3/f4 becomes lower than the lower limit of inequality (7), the refractive power of the fourth lens unit B4 becomes too weak, and the moving amount of the fourth lens unit B4 increases, and the overall lens length increases.

Inequality (8) defines a range of the focal length ratio between the fifth lens unit B5 and the second lens unit B2. The fifth lens unit B5 includes a plurality of subunits each consisting of a negative lens and a positive lens, in order from the object side to the image side, arranged side by side and has the effect of enlarging the image. As the value f5/f2 of inequality (8) increases, the light incident angle on the image plane decreases. In a case where the value f5/f2 is higher than the upper limit of inequality (8), the incident angle on the image plane becomes too small and the lens diameter of the final lens becomes large, so that the final lens cannot be accommodated within the predetermined lens mount diameter. In a case where the value f5/f2 is lower than the lower limit of inequality (8), the refractive power of the fifth lens unit B5 becomes too strong, and curvature of field and chromatic aberration of magnification tend to deteriorate.

Inequality (9) defines a range of the moving ratios of the two movable units, the second lens unit B2 and the fourth lens unit B4. In a case where the value M2/M4 becomes higher than the upper limit of inequality (9), the moving amount of the second lens unit B2 becomes too small and the refractive power of the second lens unit B2 is to increase. In a case where the value M2/M4 becomes lower than the lower limit of inequality (9), the moving amount of the fourth lens unit B4 becomes too small and the refractive power of the fourth lens unit B4 is to increase.

Inequality (10) defines a ratio of the focal length of the image stabilizing subunit to the focal length of the third lens unit B3, and defines a range of the refractive power of the image stabilizing subunit. In a case where the value fis/f3 is higher than the upper limit of inequality (10), the refractive power of the image stabilizing subunit is too weak and the moving amount of the image stabilizing subunit during image stabilizing becomes too large. In a case where the value fis/f3 is lower than the lower limit of inequality (10), the refractive power of the image stabilizing subunit is too strong, and coma aberration worsens during image stabilizing.

Inequalities (11) and (12) define conditions for satisfactorily correcting longitudinal chromatic aberration and lateral chromatic aberration. In a case where the value $\theta gf$ becomes higher than the upper limit of inequality (11), a stable optical glass cannot be obtained. In a case where the value $\theta gf$ becomes lower than the lower limit of inequality (11), the effect of correcting chromatic aberration cannot be obtained. In a case where the value vd becomes higher than the upper limit of inequality (12), the effect of correcting chromatic aberration is reduced. In a case where the value vd becomes lower than the lower limit of inequality (12), a stable optical glass cannot be obtained.

Forming the positive lens included in the fifth lens unit B5 that satisfies inequalities (11) and (12) into a meniscus shape convex to the image side can satisfactorily correct secondary chromatic aberration.

Inequalities (3) to (12) may be replaced with inequalities (3a) to (12a) below:

$$0.3 < BF/fw < 1.0 \tag{3a}$$

$$0.8 < M2/D1 < 2.0 \tag{4a}$$

$$3.0 < f1/fw < 10.0 \tag{5a}$$

$$-0.70 < f2/f4 < -0.35 \tag{6a}$$

$$1.2 < f3/f4 < 1.8 \tag{7a}$$

$$1.8 < f5/f2 < 9.0 \tag{8a}$$

$$-4.5 < M2/M4 < -1.5 \tag{9a}$$

$$1.3 < fis/f3 < 1.9 \tag{10a}$$

$$-0.00163 \times vd + 0.66000 < \theta gf < -0.00163 \times vd + 0.7300 \tag{11a}$$

$$15.0 < vd < 23.5 \tag{12a}$$

Inequalities (3) to (12) may be replaced with inequalities (3b) to (12b) below:

$$0.5 < BF/fw < 0.9 \tag{3b}$$

$$0.8 < M2/D1 < 1.5 \tag{4b}$$

$$5.0 < f1/fw < 9.0 \tag{5b}$$

$$-0.6 < f2/f4 < -0.4 \tag{6b}$$

$$1.3 < f3/f4 < 1.7 \tag{7b}$$

$$2.0 < f5/f2 < 8.0 \tag{8b}$$

$$-3.5 < M2/M4 < -2.0 \tag{9b}$$

$$1.4 < fis/f3 < 1.8 \tag{10b}$$

$$-0.00163 \times vd + 0.66400 < \theta gf < -0.00163 \times vd + 0.7100 \tag{11b}$$

$$15.0 < vd < 23.0 \tag{12b}$$

A detailed description will be given of the zoom lens according to each example.

The zoom lens according to Example 1 consists of, in order from the object side to the image side, a first lens unit B1, a second lens unit B2, a third lens unit B3, a fourth lens unit B4, and a fifth lens unit B5.

The zoom lens according to Example 2 consists of, in order from the object side to the image side, a first lens unit B1, a second lens unit B2, a third lens unit B3, a fourth lens unit B4, and a fifth lens unit B5. The zoom lens according to the Example 2 has a configuration in which the focal length of the zoom lens at the telephoto end is longer than that of the zoom lens according to Example 1. Even in this case, excellent imaging performance can be secured by satisfying the above inequalities.

The zoom lens according to Example 3 consists of, in order from the object side to the image side, a first lens unit B1, a second lens unit B2, a third lens unit B3, a fourth lens unit B4, and a fifth lens unit B5. The zoom lens according to Example 3 has a configuration in which the focal length of the zoom lens at the wide-angle end is shorter than that of the zoom lens according to Example 1. Even in this case, satisfactory imaging performance can be secured by satisfying the above inequalities.

Each example illustrates a zoom lens having a five-unit structure, but as long as a similar effect to that of each example can be obtained, a lens unit having weak refractive power can be disposed on the object side or image side of the zoom lens according to each example. An element having very weak refractive power (having substantially no refractive power) may be placed on the object side or image side of the zoom lens according to each example.

Numerical examples 1 to 3 corresponding to Examples 1 to 3 will be illustrated below.

In each numerical example, |f| is a focal length (mm), F represents an F-number, img represents an image circle diameter (mm), and ang represents a half angle of view (°). B represents a lens unit number counted from the object side to the image side. S represents a surface number given to a lens surface or aperture surface counted from the object side to the image side. s on the left side of the surface number means that the surface is the aperture stop STO. EA represents an effective diameter of a lens (mm). r represents a radius of curvature of each lens surface (mm). d is a distance (mm) on an optical axis between an i-th surface and an (i+1)-th surface, and a parenthesized distance indicates a distance between lens units. glass represents a name of a glass material. nd represents a refractive index for the d-line of the material of the i-th optical member. vd represents an Abbe number of a material of the i-th optical member based on the d-line. The Abbe number vd of a certain material is expressed as follows:

$$vd = (Nd-1)/(NF-NC)$$

where Nd, NF, and NC are refractive indices based on the d-line (587.6 nm), the F-line (486.1 nm), and the C-line (656.3 nm) in the Fraunhofer line, respectively.

A lens surface in which an asterisk * is attached to the right side of the surface number is an aspherical surface defined by the following function, and coefficients for the functions are illustrated in each numerical example. An aspheric coefficient "e-x" means $\times 10^{-x}$. The aspherical shape is expressed as follows:

$$x = (y^2/r)/[1+\{1-(1+K)(y^2/r^2)\}^{1/2}] + Ay^4 + By^6 + Cy^8 + Dy^{10} + Ey^{12} + Fy^{14}$$

where x is a displacement amount from a surface vertex of a lens surface in the optical axis direction, y is a coordinate in a radial direction based on the surface vertex of the lens surface, a light traveling direction is set positive, r is a paraxial radius of curvature, K is a conic constant, and A to F are aspherical coefficients.

In various data, values of a focal length (mm) and an F-number (FNO) are set in an in-focus state at the infinity object. An actual image height (mm) represents an image height including image distortion. Each example assumes that an image distorted by the distortion is corrected by image processing to a captured image. An overall lens length (mm) indicates a distance on the optical axis from the first surface, which is a lens surface closest to the object, to the image plane IMG. Back focus BF (mm) is a distance on the optical axis from a lens surface closest to the image plane (final lens surface) to the image plane IMG. If there is an element having no refractive power, such as a flat plate, between the final lens surface and the image plane IMG, it is an air equivalent length calculated by excluding it. The overall length is a length obtained by adding the back focus to the distance on the optical axis from the first surface to the final lens surface. In the distance data, OBJ indicates an object distance represented by the distance from the object position to the image plane IMG in each example.

NUMERICAL EXAMPLE 1
|f| = 20.01-119.99 F/4.08-4.08 img = 27.32 ang = 34.4-15.2

| B | S OBJ | EA | R | d | glass | nd | vd |
|---|---|---|---|---|---|---|---|
| 1 | 1 | 66.03 | 97.1682 | 1.5000 | SLAH95 | 1.90366 | 31.34 |
|   | 2 | 62.85 | 57.4857 | 11.0700 | SFPL51 | 1.49700 | 81.54 |
|   | 3 | 61.81 | 828.7642 | 0.3000 |   |   |   |
|   | 4 | 56.67 | 53.1290 | 9.1500 | SFPM2 | 1.59522 | 67.73 |
|   | 5 | 55.00 | 287.2910 | (0.9367) |   |   |   |
| 2 | 6* | 26.01 | −1383.4788 | 1.2000 | TAFD45 | 1.95375 | 32.32 |
|   | 7 | 21.97 | 20.5219 | 5.2000 |   |   |   |
|   | 8 | 21.84 | −33.8748 | 1.0000 | SLAL14 | 1.69680 | 55.53 |
|   | 9 | 21.63 | 78.3769 | 0.3000 |   |   |   |
|   | 10 | 21.71 | 44.9883 | 5.6000 | STIH53 | 1.84666 | 23.78 |

-continued

| | | EA | R | d | glass | nd | vd |
|---|---|---|---|---|---|---|---|
| | 11 | 21.36 | −26.0967 | 0.5150 | | | |
| | 12 | 20.92 | −22.7801 | 1.0000 | SLAH89 | 1.85150 | 40.78 |
| | 13 | 20.62 | −237.1036 | (41.2153) | | | |
| 3 | s14 | 14.94 | 1e+018 | 1.0000 | | | |
| | 15* | 19.16 | 29.9339 | 3.6000 | SFPL51 | 1.49700 | 81.54 |
| | 16 | 19.40 | −566.8117 | 0.8000 | | | |
| | 17 | 20.47 | 59.1528 | 1.0000 | TAFD45 | 1.95375 | 32.32 |
| | 18 | 20.27 | 25.9450 | 4.0000 | SLAL58 | 1.69350 | 50.81 |
| | 19 | 20.30 | −126.1091 | 0.8000 | | | |
| | 20 | 19.53 | 45.6683 | 1.2000 | SLAL14 | 1.69680 | 55.53 |
| | 21 | 19.14 | 26.8471 | (22.6407) | | | |
| 4 | 22 | 20.08 | 20.0576 | 5.0000 | SFPL51 | 1.49700 | 81.54 |
| | 23 | 19.52 | −151.5934 | 0.3000 | | | |
| | 24 | 18.45 | 28.3488 | 3.3000 | SFPL51 | 1.49700 | 81.54 |
| | 25 | 17.60 | −163.5093 | 1.0000 | SLAH52 | 1.79952 | 42.22 |
| | 26* | 16.48 | 26.5017 | 0.8000 | | | |
| | 27* | 16.24 | 28.1092 | 2.4000 | SBAL42 | 1.58313 | 59.37 |
| | 28* | 15.54 | 113.7278 | (1.4205) | | | |
| 5 | 29 | 14.50 | 109.2493 | 1.0000 | SLAH89 | 1.85150 | 40.78 |
| | 30 | 14.32 | 18.8346 | 2.3000 | | | |
| | 31 | 14.46 | −39.5201 | 2.1000 | EFDS1W | 1.92286 | 20.88 |
| | 32 | 15.23 | −24.4137 | 9.0000 | | | |
| | 33 | 18.03 | −17.8671 | 1.0000 | TAFD45 | 1.95375 | 32.32 |
| | 34 | 19.85 | −51.4100 | 0.3000 | | | |
| | 35 | 23.19 | 40.3016 | 6.0000 | SBSL7 | 1.51633 | 64.14 |
| | 36 | 24.00 | −32.1527 | | | | |
| | IMG | | | | | | |

ASPHERIC DATA surface 6
$r = -1.38348e+003$ $K = 0.00000e+000$ $A = 4.45817e-006$ $B = -2.62754e-009$
$C = -7.55319e-012$ $D = 1.11792e-013$ $E = 0.00000e+000$ $F = 0.00000e+000$
surface 15
$r = 2.99339e+001$ $K = 0.00000e+000$ $A = -9.27353e-006$ $B = 6.66006e-009$
$C = -8.70310e-011$ $D = 4.89575e-013$ $E = 0.00000e+000$ $F = 0.00000e+000$
surface 27
$r = 2.81092e+001$ $K = 0.00000e+000$ $A = 2.56153e-005$ $B = 3.66705e-007$
$C = 3.10854e-010$ $D = 2.63528e-011$ $E = 0.00000e+000$ $F = 0.00000e+000$
surface 28
$r = 1.13728e+002$ $K = 0.00000e+000$ $A = 5.80405e-005$ $B = 5.18295e-007$
$C = -6.86215e-010$ $D = 4.96736e-011$ $E = 0.00000e+000$ $F = 0.00000e+000$

VARIOUS DATA

| | WIDE | MIDDLE | TELE | WIDE-CLOSE | MIDDLE-CLOSE | TELE-CLOSE |
|---|---|---|---|---|---|---|
| Focal Length | 20.02 | 50.03 | 119.95 | | | |
| FNO | 4.08 | 4.08 | 4.08 | | | |
| Half Angle of View (°) | 34.40 | 15.16 | 6.31 | | | |
| Actual Image Height | 12.33 | 13.66 | 13.66 | | | |
| Overall Length | 165.00 | 165.00 | 165.00 | | | |
| BF | 13.54 | 13.54 | 13.54 | | | |
| d0 | INF | INF | INF | 235 | 635 | 1035 |
| d6 | 0.9367 | 26.2908 | 41.1559 | | | |
| d14 | 41.2153 | 15.8301 | 1.0000 | | | |
| d22 | 22.6407 | 15.2078 | 6.7729 | 22.2066 | 14.2079 | 2.2200 |
| d29 | 1.4205 | 8.8815 | 17.2859 | 1.8546 | 9.8792 | 21.8418 |

Lens Unit Data

| Lens Unit | Starting Surface | Focal Length |
|---|---|---|
| B1 | 1 | 93.0357 |
| B2 | 7 | −16.2313 |
| B3 | 15 | 50.4265 |
| B4 | 23 | 32.4957 |
| B5 | 30 | −47.1450 |

NUMERICAL EXAMPLE 2
|f| = 20.01-134.95 F/4.08-4.08 img = 27.32 ang = 34.3-15.1

| B | S OBJ | EA | R | d | glass | nd | vd |
|---|---|---|---|---|---|---|---|
| 1 | 1 | 63.83 | 107.8167 | 1.5000 | SLAH95 | 1.90366 | 31.34 |
| | 2 | 61.19 | 62.7045 | 10.7000 | SFPL51 | 1.49700 | 81.54 |

-continued

| | | | | | | | |
|---|---|---|---|---|---|---|---|
| | 3 | 60.21 | −976.9606 | 0.3000 | | | |
| | 4 | 54.46 | 53.6503 | 8.2000 | SFPM2 | 1.59522 | 67.73 |
| | 5 | 52.69 | 234.6119 | (1.0633) | | | |
| 2 | 6* | 26.99 | 484.0341 | 1.0000 | TAFD45 | 1.95375 | 32.32 |
| | 7 | 22.73 | 20.0167 | 5.6000 | | | |
| | 8 | 22.63 | −34.3423 | 1.0000 | SLAL14 | 1.69680 | 55.53 |
| | 9 | 22.33 | 57.7374 | 0.3000 | | | |
| | 10 | 22.47 | 38.4457 | 6.0500 | STIH53 | 1.84666 | 23.78 |
| | 11 | 22.09 | −26.4360 | 0.6500 | | | |
| | 12 | 21.53 | −22.2250 | 1.0000 | SLAH89 | 1.85150 | 40.78 |
| | 13 | 21.27 | −212.5288 | (44.6455) | | | |
| 3 | s14 | 15.63 | 1e+018 | 1.0000 | | | |
| | 15* | 19.12 | 25.1590 | 3.6000 | SFPL51 | 1.49700 | 81.54 |
| | 16 | 19.20 | 116.8660 | 1.0900 | | | |
| | 17 | 20.60 | 64.0886 | 1.0000 | TAFD45 | 1.95375 | 32.32 |
| | 18 | 20.42 | 25.6060 | 4.3500 | SBAH10 | 1.67003 | 47.23 |
| | 19 | 20.50 | −70.4913 | 0.6000 | | | |
| | 20 | 19.01 | 30.4363 | 1.0000 | SLAL14 | 1.69680 | 55.53 |
| | 21 | 18.53 | 21.8889 | (20.6049) | | | |
| 4 | 22 | 19.12 | 19.4437 | 5.0000 | SFPL51 | 1.49700 | 81.54 |
| | 23 | 18.52 | −141.0547 | 0.3000 | | | |
| | 24 | 17.86 | 35.5865 | 3.3000 | SFPL51 | 1.49700 | 81.54 |
| | 25 | 17.21 | −73.8414 | 1.0000 | SLAM66 | 1.80100 | 34.97 |
| | 26 | 16.49 | 32.0389 | 0.3200 | | | |
| | 27* | 16.47 | 35.9616 | 2.3000 | SBAL42 | 1.58313 | 59.37 |
| | 28* | 16.01 | 256.0985 | (1.1007) | | | |
| 5 | 29 | 15.54 | 115.0194 | 1.0000 | SLAH89 | 1.85150 | 40.78 |
| | 30 | 15.16 | 21.9152 | 2.5000 | | | |
| | 31 | 15.20 | −28.9868 | 2.4000 | SNPH1 | 1.80809 | 22.76 |
| | 32 | 15.82 | −17.4279 | 4.6000 | | | |
| | 33 | 15.73 | −13.8276 | 1.0000 | SLAH89 | 1.85150 | 40.78 |
| | 34 | 17.90 | −543.8315 | 3.2000 | | | |
| | 35 | 22.62 | 252.1738 | 4.6000 | SFPL51 | 1.49700 | 81.54 |
| | 36 | 24.15 | −32.5503 | 0.3000 | | | |
| | 37 | 28.10 | 38.0000 | 6.5000 | STIL1 | 1.54814 | 45.78 |
| | 38 | 28.38 | −59.9389 | | | | |
| | IMG | | | | | | |

ASPHERIC DATA surface 6
$r = 4.84034e+002$ $K = 0.00000e+000$ $A = 3.08024e-006$ $B = -3.40028e-010$
$C = -6.39982e-012$ $D = 1.25935e-013$ $E = 0.00000e+000$ $F = 0.00000e+000$ surface 15
$r = 2.51590e+001$ $K = 0.00000e+000$ $A = -1.16571e-005$ $B = -8.07396e-009$
$C = 3.66989e-011$ $D = -7.95149e-014$ $E = 0.00000e+000$ $F = 0.00000e+000$ surface 27
$r = 3.59616e+001$ $K = 0.00000e+000$ $A = 2.90954e-005$ $B = 4.47229e-007$
$C = 3.91657e-010$ $D = 2.38388e-011$ $E = 0.00000e+000$ $F = 0.00000e+000$ surface 28
$r = 2.56099e+002$ $K = 0.00000e+000$ $A = 5.94204e-005$ $B = 5.77129e-007$
$C = -2.56978e-010$ $D = 4.58233e-011$ $E = 0.00000e+000$ $F = 0.00000e+000$

VARIOUS DATA

| | WIDE | MIDDLE | TELE | WIDE-CLOSE | MIDDLE-CLOSE | TELE-CLOSE |
|---|---|---|---|---|---|---|
| Focal Length | 20.01 | 50.01 | 134.95 | | | |
| FNO | 4.08 | 4.08 | 4.08 | | | |
| Half Angle of View (°) | 34.29 | 15.08 | 5.61 | | | |
| Actual Image Height | 12.33 | 13.66 | 13.66 | | | |
| Overall Length | 168.51 | 168.47 | 168.50 | | | |
| BF | 13.82 | 13.82 | 13.82 | | | |
| d0 | INF | INF | INF | 230 | 630 | 1030 |
| d5 | 1.0633 | 26.8834 | 44.7092 | | | |
| d13 | 44.6455 | 18.7996 | 1.0000 | | | |
| d21 | 20.6049 | 14.0010 | 7.1139 | 20.1904 | 13.0987 | 2.6000 |
| d28 | 1.1007 | 7.7299 | 14.5916 | 1.5151 | 8.6322 | 19.1059 |

Lens Unit Data

| Lens Unit | Starting Surface | focal length |
|---|---|---|
| B1 | 1 | 91.0192 |
| B2 | 6 | −16.3640 |
| B3 | 14 | 47.7245 |
| B4 | 22 | 34.0997 |
| B5 | 29 | −125.5530 |

NUMERICAL EXAMPLE 3
|f| = 18.41-101.96 F/4.08-4.08 img = 27.32 ang = 36.6-15.1

| B | S OBJ | EA | R | d | glass | nd | vd |
|---|---|---|---|---|---|---|---|
| 1 | 1 | 65.93 | 98.2076 | 1.5000 | SLAH95 | 1.90366 | 31.34 |
|   | 2 | 62.69 | 56.6607 | 12.3000 | SFPL51 | 1.49700 | 81.54 |
|   | 3 | 61.69 | −848.7753 | 0.3000 |  |  |  |
|   | 4 | 54.91 | 48.3997 | 9.2500 | SFPM2 | 1.59522 | 67.73 |
|   | 5 | 52.88 | 225.6590 | (1.1932) |  |  |  |
| 2 | 6 | 28.20 | 196.5503 | 1.2000 | TAFD45 | 1.95375 | 32.32 |
|   | 7 | 22.58 | 17.3966 | 6.1000 |  |  |  |
|   | 8 | 22.44 | −37.0226 | 1.0000 | SLAL14 | 1.69680 | 55.53 |
|   | 9 | 21.98 | 49.1838 | 0.3000 |  |  |  |
|   | 10 | 22.12 | 31.3584 | 5.9200 | STIH53 | 1.84666 | 23.78 |
|   | 11 | 21.59 | −30.3809 | 0.5400 |  |  |  |
|   | 12 | 21.09 | −25.8740 | 1.0000 | SLAH89 | 1.85150 | 40.78 |
|   | 13 | 20.45 | 464.2321 | (35.2668) |  |  |  |
| 3 | s14 | 12.80 | 1e+018 | 1.0000 |  |  |  |
|   | 15* | 15.92 | 21.3480 | 3.1500 | SFPL51 | 1.49700 | 81.54 |
|   | 16 | 15.97 | 102.3225 | 0.8000 |  |  |  |
|   | 17 | 17.27 | 54.7871 | 1.0000 | TAFD45 | 1.95375 | 32.32 |
|   | 18 | 17.08 | 21.1227 | 3.6100 | SLAM3 | 1.71700 | 47.93 |
|   | 19 | 17.10 | −94.4947 | 0.6000 |  |  |  |
|   | 20 | 15.88 | 37.7066 | 1.0000 | SBSL7 | 1.51633 | 64.14 |
|   | 21 | 15.57 | 20.2630 | (15.7146) |  |  |  |
| 4 | 22 | 16.14 | 15.1244 | 5.3000 | SFPL51 | 1.49700 | 81.54 |
|   | 23 | 15.39 | −41.0161 | 1.1000 |  |  |  |
|   | 24 | 14.42 | −48.0462 | 1.0000 | SNBH58 | 1.78880 | 28.43 |
|   | 25 | 14.00 | 169.2232 | 0.3000 |  |  |  |
|   | 26* | 13.77 | 61.0313 | 2.2000 | SBAL42 | 1.58313 | 59.37 |
|   | 27* | 13.44 | −367.6149 | (0.6935) |  |  |  |
| 5 | 28 | 13.80 | 36.2844 | 0.8000 | SLAH65V | 1.80400 | 46.58 |
|   | 29 | 13.56 | 16.8380 | 2.6650 |  |  |  |
|   | 30 | 13.79 | −31.9424 | 2.2000 | SNPH1 | 1.80809 | 22.76 |
|   | 31 | 14.49 | −19.4468 | 5.5500 |  |  |  |
|   | 32* | 15.29 | −12.3340 | 1.0000 | LLAH94 | 1.86100 | 37.10 |
|   | 33* | 17.67 | −85.0553 | 0.6650 |  |  |  |
|   | 34 | 20.96 | 45.1615 | 6.5000 | SFSL5 | 1.48749 | 70.24 |
|   | 35 | 22.17 | −20.4356 |  |  |  |  |
|   | IMG |  |  |  |  |  |  |

ASPHERIC DATA surface 15
r = 2.13480e+001 K = 0.00000e+000 A = −1.73848e−005 B = −2.50756e−008
C = 4.72402e−011 D = −3.38022e−013 E = 0.00000e+000 F = 0.00000e+000
surface 26
r = 6.10313e+001 K = 0.00000e+000 A = 3.96721e−005 B = 6.09374e−007
C = 5.15667e−009 D = −4.54825e−011 E = 0.00000e+000 F = 0.00000e+000
surface 27
r = −3.67615e+002 K = 0.00000e+000 A = 1.01834e−004 B = 9.00877e−007
C = 5.38464e−009 D = −6.24767e−012 E = 0.00000e+000 F = 0.00000e+000
surface 32
r = −1.23340e+001 K = 0.00000e+000 A = 5.07317e−006 B = 2.81676e−007
C = −3.46058e−009 D = 2.65520e−011 E = 0.00000e+000 F = 0.00000e+000
surface 33
r = −8.50553e+001 K = 0.00000e+000 A = −1.07295e−006 B = 1.76138e−007
C = −2.91744e−009 D = 2.46938e−011 E = −6.39575e−014 F = 0.00000e+000

VARIOUS DATA

|  | WIDE | MIDDLE | TELE | WIDE-CLOSE | MIDDLE-CLOSE | TELE-CLOSE |
|---|---|---|---|---|---|---|
| Focal Length | 18.41 | 50.02 | 101.96 |  |  |  |
| FNO | 4.08 | 4.08 | 4.08 |  |  |  |
| Half Angle of View (°) | 36.59 | 15.05 | 7.42 |  |  |  |
| Actual Image Height | 12.33 | 13.66 | 13.66 |  |  |  |
| Overall Length | 146.50 | 146.48 | 146.49 |  |  |  |
| BF | 13.77 | 13.77 | 13.77 |  |  |  |
| d0 | INF | INF | INF | 252 | 652 | 1052 |
| d5 | 1.1932 | 24.4220 | 35.4608 |  |  |  |
| d13 | 35.2668 | 12.0118 | 1.0000 |  |  |  |
| d21 | 15.7146 | 9.5071 | 4.9651 | 15.3646 | 8.5117 | 2.0250 |
| d27 | 0.6935 | 6.9267 | 11.4424 | 1.0435 | 7.9217 | 14.3833 |

Lens Unit Data

| Lens Unit | Starting Surface | Focal Length |
|---|---|---|
| B1 | 1 | 81.3708 |

-continued

| | | |
|---|---|---|
| B2 | 6 | −14.8663 |
| B3 | 14 | 45.5203 |
| B4 | 22 | 28.5770 |
| B5 | 28 | −41.5130 |

Table 1 summarizes various values in each numerical example.

TABLE 1

| | | NUMERICAL EXAMPLE 1 | NUMERICAL EXAMPLE 2 | NUMRICAL EXAMPLE 3 |
|---|---|---|---|---|
| INEQUALITY (1) | $\beta 3w/\beta 3t$ | −0.787 | −0.288 | −0.636 |
| INEQUALITY (2) | f1/f2 | −5.735 | −5.562 | −5.475 |
| INEQUALITY (3) | BF/fw | 0.677 | 0.692 | 0.749 |
| INEQUALITY (4) | M2/D1 | 1.065 | 1.168 | 0.844 |
| INEQUALITY (5) | f1/fw | 4.646 | 4.547 | 4.418 |
| INEQUALITY (6) | f2/f4 | −0.499 | −0.479 | −0.520 |
| INEQUALITY (7) | f3/f4 | 1.552 | 1.397 | 1.592 |
| INEQUALITY (8) | f5/f2 | 2.890 | 7.720 | 2.781 |
| INEQUALITY (9) | M2/M4 | −2.534 | −3.236 | −3.188 |
| INEQUALITY (10) | fis/f3 | 1.718 | 1.585 | 1.602 |
| INEQUALITY (11) | $\theta gf$ | 0.639 | 0.631 | 0.631 |
| INEQUALITY (12) | $\nu d$ | 20.880 | 22.760 | 22.760 |

Image Pickup Apparatus

Figure 7:
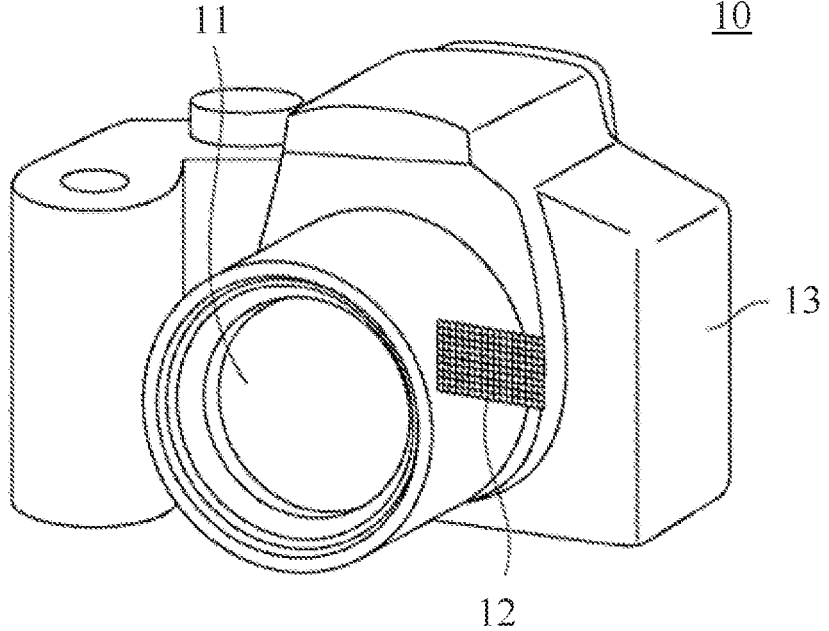
FIG. 7 is a schematic diagram of an image pickup apparatus.

Referring now to FIG. 7, a description will be given of a digital still camera (image pickup apparatus) using the zoom lens according to each example of the disclosure as an imaging optical system. FIG. 7 illustrates the configuration of the image pickup apparatus 10. In FIG. 7, an image pickup apparatus 10 includes a camera body 13, a lens apparatus 11 including any one of the zoom lenses according to Examples 1 to 3, and an image sensor (light receiving element) 12 configured to receive and photoelectrically convert an optical image formed by the zoom lens. The image sensor 12 is built in the camera body 13. The image sensor 12 can use a solid-state image sensor (photoelectric conversion element) such as a CCD sensor or a CMOS sensor. The lens apparatus 11 and the camera body 13 may be integrated with each other, or the lens apparatus 11 may be attachable to and detachable from the camera body 13. The camera body 13 may be a so-called single-lens reflex camera having a quick turn mirror, or a so-called mirrorless camera without a quick turn mirror.

Applying the zoom lens according to each example to an image pickup apparatus such as a digital still camera can provide an image pickup apparatus 10 having a high zoom ratio, and high optical performance in an overall zoom range.

The image pickup apparatus 10 according to this example is not limited to the digital still camera illustrated in FIG. 7, but is applicable to various image pickup apparatuses such as broadcasting cameras, film-based cameras, surveillance cameras, and the like.

Imaging System

An imaging system (surveillance camera system) may include the zoom lens according to any one of Examples 1 to 3 and a control unit configured to control the zoom lens. The control unit can control the zoom lens so that each lens unit moves as described above during zooming, focusing, and image stabilization. The control unit may not be integrated with the zoom lens, and the control unit may be separated from the zoom lens. For example, a control unit (control apparatus) remote from a driving unit configured to drive each lens of the zoom lens may include a transmission unit that transmits a control signal (command) for controlling the zoom lens. Such a control unit can remotely control the zoom lens.

The control unit may include an operation unit such as a controller and a button for remotely operating the zoom lens, and may control the zoom lens according to the input of the user to the operation unit. For example, the operation unit may include an enlargement button and a reduction button. A signal may be sent from the control unit to the driving unit of the zoom lens so that in a case where the user presses the enlarge button, the magnification of the zoom lens increases, and in a case where the user presses the reduce button, the magnification of the zoom lens decreases.

The imaging system may also include a display unit such as a liquid crystal panel configured to display information (moving state) about zoom of the zoom lens. The information about the zoom of the zoom lens is, for example, the zoom magnification (zoom state) and the moving amount (moving state) of each lens unit. The user can remotely operate the zoom lens through the operation unit while viewing the information about the zoom of the zoom lens displayed on the display unit. The display unit and the operation unit may be integrated by adopting a touch panel or the like.

Each example can provide a zoom lens having a high zoom ratio, and high optical performance in an overall zoom range.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-096184, filed on Jun. 15, 2022, which is hereby incorporated by reference herein in its entirety.

What is claimed is:

1. A zoom lens comprising, in order from an object side to an image side, a first lens unit having positive refractive power, a second lens unit having negative refractive power, a third lens unit having positive refractive power, a fourth lens unit having positive refractive power, and a fifth lens unit having negative refractive power, wherein during zooming from a wide-angle end to a telephoto end, a distance between adjacent lens units changes, the first lens unit and the third lens unit are fixed, and the second lens unit and the fourth lens unit move, wherein the third lens unit includes a negative lens and a positive lens, and wherein the following inequalities are satisfied:

$$-3.50 < \beta 3w/\beta 3t < -0.10$$

$$-10.0 < f1/f2 < -4.0$$

$$1.2 < f3/f4 < 2.0$$

$$-6.0 < M2/M4 < -1.5$$

$$0.8 < M2/D1 < 2.0$$

where $\beta 3w$ is a lateral magnification of the third lens unit at the wide-angle end, $\beta 3t$ is a lateral magnification of the third lens unit at the telephoto end, f1 is a focal length of the first lens unit, f2 is a focal length of the second lens unit, f3 is a focal length of the third lens unit, f4 is a focal length of the fourth lens unit, M2 is a moving amount of the second lens unit during zooming from the wide-angle end to the telephoto end, M4 is a moving amount of the fourth lens unit during zooming from the wide-angle end to the telephoto end, and D1 is a distance on an optical axis from a lens surface closest to an object in the first lens unit to a lens surface closest to an image plane in the first lens unit.

2. The zoom lens according to claim 1, wherein the following inequality is satisfied:

$$0.2 < BF/fw < 1.2$$

where BF is an air conversion length of a distance on an optical axis from a lens surface closest to an image plane to the image plane at the wide-angle end of the zoom lens, and fw is a focal length of the zoom lens at the wide-angle end.

3. The zoom lens according to claim 1, wherein the following inequality is satisfied:

$$2.0 < f1/fw < 12.0$$

where fw is a focal length of the zoom lens at the wide-angle end.

4. The zoom lens according to claim 1, wherein the following inequality is satisfied:

$$-0.8 < f2/f4 < -0.3$$

where f4 is a focal length of the fourth lens unit.

5. The zoom lens according to claim 1, wherein the following inequality is satisfied:

$$1.5 < f5/f2 < 10.0$$

where f5 is a focal length of the fifth lens unit.

6. The zoom lens according to claim 1, wherein the third lens unit includes an image stabilizing subunit configured to move in a direction having a component in a direction orthogonal to an optical axis during image stabilization, and wherein the following inequality is satisfied:

$$1.2 < fis/f3 < 2.0$$

where fis is a focal length of the image stabilizing subunit, and f3 is a focal length of the third lens unit.

7. The zoom lens according to claim 1, wherein the third lens unit consists of, in order from the object side to the image side, a first subunit having positive refractive power, a second subunit having positive refractive power, and a third subunit having negative refractive power, wherein the second subunit is a cemented lens of a negative lens and a positive lens arranged in order from the object side to the image side, and wherein the second subunit moves in a direction having a component in a direction orthogonal to an optical axis during image stabilization.

8. The zoom lens according to claim 1, wherein the fifth lens unit includes a positive lens, and wherein the following inequality is satisfied:

$$-0.00163 \times vd + 0.65800 < \theta gf < -0.00163 \times vd + 0.7500$$

where $\theta gf$ is a partial dispersion ratio of the positive lens of the fifth lens unit for g-line and f-line, and vd is an Abbe number of the positive lens of the fifth lens unit based on d-line.

9. The zoom lens according to claim 8, wherein the positive lens included in the fifth lens unit has a meniscus shape convex to the image side, and the following inequality is satisfied:

$$15.0 < vd < 24.2.$$

10. The zoom lens according to claim 1, wherein the zoom lens consists of, in order from the object side to the image side, the first lens unit, the second lens unit, the third lens unit, the fourth lens unit, and the fifth lens unit.

11. The zoom lens according to claim 1, wherein the first lens unit consists of, in order from the object side to the image side, a cemented lens of a negative lens and a positive lens, and a positive lens.

12. The zoom lens according to claim 1, wherein the second lens unit consists of four lenses or less.

13. The zoom lens according to claim 12, wherein the second lens unit consists of, in order from the object side to the image side, a negative lens, a negative lens, a positive lens, and a negative lens.

14. The zoom lens according to claim 1, wherein the third lens unit includes an aperture stop.

15. The zoom lens according to claim 1, wherein the fourth lens unit consists of three or four lenses.

16. The zoom lens according to claim 15, wherein the fourth lens unit consists of, in order from the object side to the image side, a positive lens, a positive lens, a negative lens, and a positive lens.

17. An image pickup apparatus comprising:

a zoom lens; and an image sensor configured to receive an image formed by the zoom lens, wherein the zoom lens includes, in order from an object side to an image side, a first lens unit having positive refractive power, a second lens unit having negative refractive power, a third lens unit having positive refractive power, a fourth lens unit having positive refractive power, and a fifth lens unit having negative refractive power, wherein during zooming from a wide-angle end to a telephoto end, a distance between adjacent lens units changes, the first lens unit and the third lens unit are fixed, and the second lens unit and the fourth lens unit move, wherein the third lens unit includes a negative lens and a positive lens, and wherein the following inequalities are satisfied:

$$-3.50 < \beta 3w/\beta 3t < -0.10$$

$$-10.0 < f1/f2 < -4.0$$

$$1.2 < f3/f4 < 2.0$$

$$-6.0 < M2/M4 < -1.5$$

$$0.8 < M2/D1 < 2.0$$

where $\beta3w$ is a lateral magnification of the third lens unit at the wide-angle end, $\beta3t$ is a lateral magnification of the third lens unit at the telephoto end, f1 is a focal length of the first lens unit, f2 is a focal length of the second lens unit, f3 is a focal length of the third lens unit, f4 is a focal length of the fourth lens unit, M2 is a moving amount of the second lens unit during zooming from the wide-angle end to the telephoto end, M4 is a moving amount of the fourth lens unit during zooming from the wide-angle end to the telephoto end, and D1 is a distance on an optical axis from a lens surface closest to an object in the first lens unit to a lens surface closest to an image plane in the first lens unit.

\* \* \* \* \*